UNITED STATES PATENT OFFICE.

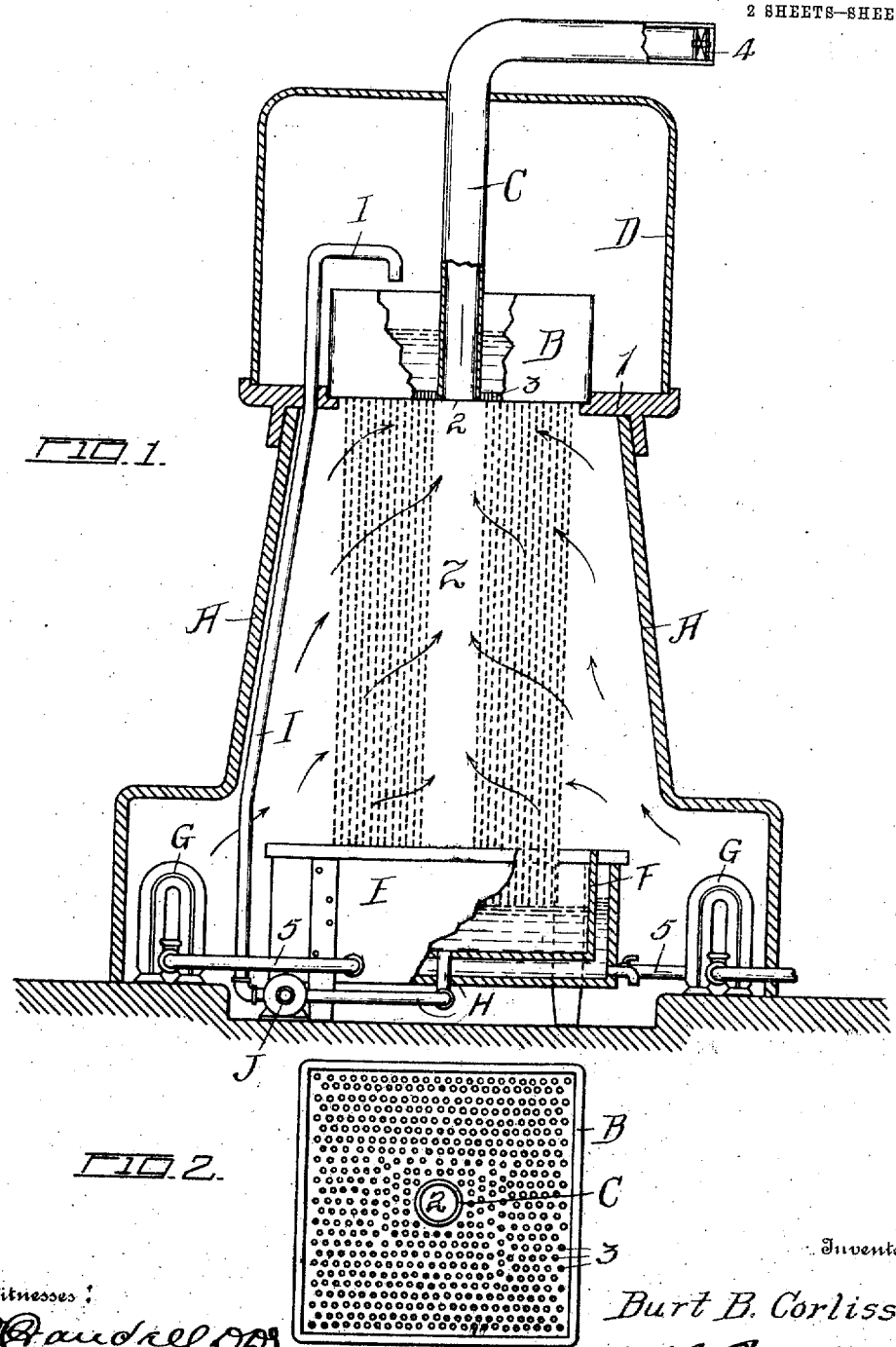

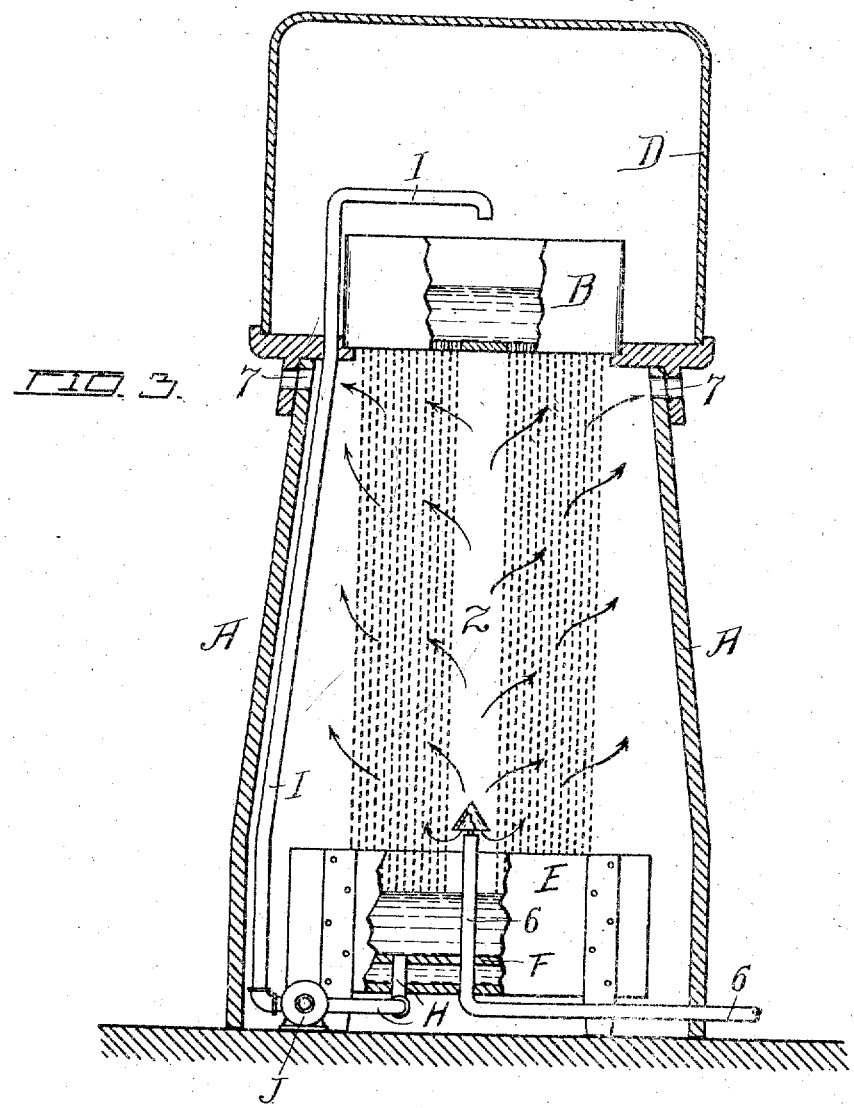

BURT B. CORLISS, OF OMAHA, NEBRASKA.

PROCESS OF CONDENSING OR EVAPORATING LIQUIDS.

986,365.
Specification of Letters Patent.
Patented Mar. 7, 1911.

Application filed July 24, 1906. Serial No. 327,588.

*To all whom it may concern:*

Be it known that I, BURT B. CORLISS, citizen of the United States, residing at Omaha, in the county of Douglas and State of Nebraska, have invented certain new and useful Improvements in Processes of Condensing or Evaporating Liquids, of which the following is a specification.

My invention relates to a process for evaporation of water from milk, (either whole or skimmed) thereby condensing the same, and has for its object to render the process, more expeditious and considerably cheaper than the process now in use.

My invention consists, substantially, in making little streams of the milk in question to fall from a receptacle into a vat or the like directly below, which little stream of milk passes through air or currents of air and which little streams do not, except in a slight degree, interrupt the free passage of the air or air currents, around, and between, each stream thereby allowing a maximum amount of exposure to the air of the falling liquid, thus throwing off the moisture which it is desired to dispose of.

The air or currents of air enter the little streams near the bottom of the condensing apparatus, and as the body of falling liquid has an air passage through the entire length thereof, the air naturally to escape through the outlet opening, has to pass in and between each little stream thus attracting or drawing the moisture from the liquid being treated and carrying same away.

The means and apparatus for practicing this new process of condensing may be of various kinds.

The form of apparatus, by means of which the process may be carried out, is shown in the accompanying drawings in which:—

Figure 1, is a vertical section of an apparatus with the upper perforated receptacle and the lower vat partly in section. Fig. 2, is a plan view of the upper receptacle clearly showing the fine perforations and the circular opening in the center of the same. Fig. 3, is a view similar to Fig. 1, illustrating a modification.

A, is a suitable casing or housing having tapering sides but which is larger at its bottom than at its top.

B, is a receptacle placed upon the open top 1, of the casing A, which has its bottom provided at the center thereof with a fair sized circular opening 2, and the balance of said bottom being provided with small perforations 3.

C, is an outlet pipe for the air and moisture to escape and is secured to the bottom of the receptacle B, registering with the hole or opening 2. This pipe C, is sometimes provided with a fan 4, at one end as shown in Fig. 1, so that the passage of the air may be increased by means of suction.

D, is a cover for the receptacle B, to keep all particles from dropping into the liquid to be treated.

E, is a vat or the like provided with the inner vat or receptacle F, for catching the liquid when falling. This vat E, is provided with a water space between its walls and the walls of the receptacle F, for keeping the liquid at any certain temperature desired.

5, is a pipe connecting the radiators G with the vat E.

H, is a feed pipe leading from the vat to the pump J, which pumps and forces the liquid from the vat to the upper perforated receptacle B, through the pipes H and I.

The operation of my invention is as follows:—The milk to be treated or condensed is first placed into the lower vat then elevated to the upper receptacle B, from where it falls into the vat below in fine streams. As there are no little streams interrupting the center of the body of milk, it will be observed, it provides an opening or air passage Z, through the outlet pipe C, thus causing air or currents of air from the radiators or inlets to pass around and between each little stream in order to escape through the outlet C, which is the only outlet for the air to escape. It will be observed the milk, which it is desired to condense or evaporate is allowed to fall in little streams and in so falling, passes through air or currents of air as shown by arrows which air naturally seeks the center of the body of falling liquid, the watery part of the milk being treated by mixing with air, is carried off by it. The liquid can be dropped from height enough to cause it to be condensed, or watery parts evaporated sufficiently by the time it reaches the vat at the bottom or it can be dropped a shorter distance and elevated by means of a pump or the like and process of dropping being repeated until proper consistency is obtained.

The milk which I desire to be evaporated or condensed, it will be observed, falls in little streams and passing through the air or currents of air as above described, constantly presents a new surface to the air allowing watery parts of the liquid to become mixed with, or exposed to the air and said watery parts then carried off by the air currents.

A modification of my apparatus is shown in Fig. 3, and it will be readily seen that the same results appear by passing a pipe 6, through the vat and allowing air to pass through the same which will, in order to escape, have to completely surround each little stream and in performing this duty, it finds its escape through the openings 7, provided inside of the casing A, as clearly shown in Fig. 3. The body of falling milk is exactly the same as that shown in Fig. 1, provided with the central circular passage Z, but instead of the bottom of the perforated receptacle B, being provided with the central circular opening 2, it is not in this case, thus, causing the air to pass from the center of the falling body of liquid to the outer side thereof whereby it finds its escape.

It is to be understood that my invention is not for obtaining the solid constituents contained in milk, in the form of dry powder, and should not be mistaken as such, as my process will not accomplish this result. My object is to condense milk only.

What I claim is:—

An apparatus for condensing milk comprising a housing, a milk receptacle having its bottom provided with a multiplicity of small openings supported at the top of said housing, a pipe secured to the bottom of said receptacle to provide an air passage for said housing, a vat located within said housing directly beneath said milk receptacle, radiators located within said housing adjacent said vat, pipes connecting said radiators with said vat, a pipe leading from the bottom of said vat to said milk receptacle, a pump located intermediate the ends of said pipe and connected therewith for the purpose of elevating liquid from said vat into said milk receptacle, and a cover for said milk receptacle.

In testimony whereof I affix my signature in presence of two witnesses.

BURT B. CORLISS.

Witnesses:
GLYNN SHAFENBERG,
CHAS. C. PEABODY.